United States Patent [19]
Chien

[11] Patent Number: 6,006,435
[45] Date of Patent: Dec. 28, 1999

[54] AIR-TIGHT SEALING ARRANGEMENT OF A HANDY PNEUMATIC POWER SAW

[76] Inventor: Mei-Hsiu Chien, 8F-6, No.100, Sec. 2, Hoping E.Rd., Taipei, Taiwan

[21] Appl. No.: 09/083,910

[22] Filed: May 22, 1998

[51] Int. Cl.⁶ .................................................... B27B 19/00
[52] U.S. Cl. ............................................ 30/392; 30/277.4
[58] Field of Search .................................. 30/277.4, 392, 30/393, 394

[56] References Cited

U.S. PATENT DOCUMENTS

| | | | |
|---|---|---|---|
| 3,155,011 | 11/1964 | Hyskell | 30/392 |
| 3,832,772 | 9/1974 | Sumida | 30/392 |
| 5,218,767 | 6/1993 | Wells | 30/277.4 |
| 5,511,912 | 4/1996 | Ellerbrock | 30/392 |

*Primary Examiner*—Hwei-Siu Payer
*Attorney, Agent, or Firm*—Rosenberg, Klein & Lee

[57] ABSTRACT

An air-tight sealing arrangement used in a handy pneumatic power saw comprised of a casing, an actuating member mounted in an actuating chamber in the casing, an end block unit fastened to one end of the casing and coupled to the actuating unit, a saw blade connected to a piston rod of the actuating unit, and a trigger for operation control, the air-tight sealing arrangement including an annular metal member mounted around the piston rod of the actuating unit and retained between an air cylinder of the actuating unit and a front side wall of the actuating chamber of the casing, and a flexible sealing gasket mounted around the piston rod of the actuating unit and retained between the annular metal member and the front side wall of the actuating chamber.

1 Claim, 4 Drawing Sheets

AIR-TIGHT SEALING ARRANGEMENT OF A HANDY PNEUMATIC POWER SAW

BACKGROUND OF THE INVENTION

The present invention relates to a handy pneumatic power saw, and more specifically to an air-tight sealing arrangement for a handy pneumatic power saw which presents an air leakage, and ensures a positive reciprocating motion of the saw blade.

FIGS. 1 and 2 show a handy pneumatic power saw according to the prior art. This structure of handy pneumatic power saw is generally comprised of a casing 10, an actuating unit 11, a saw blade 12, an end block unit 13, and a trigger 14. The casing 10 defines a longitudinal sliding hole 100 and an actuating chamber 101. The longitudinal sliding hole 100 and the actuating chamber 101 have different diameters, and are longitudinally aligned. The actuating unit 11 is mounted in the actuating chamber 101, comprised of a piston rod 110, a piston 111 fixedly mounted on one end namely the rear end of the piston rod 110, an air cylinder 112, two rubber cushions 113 fastened to front and rear sides of the piston 111, a valve 115 fastened to one end namely the rear end of the air cylinder 112, and a gasket 130 retained between the end block unit 13 and the casing 10. An opposite end namely the front end of the piston rod 110 is inserted through the longitudinal sliding hole 100, and connected to the saw blade 12. The saw blade 12 is fastened to the front end of the piston rod 110 by a chuck 114. The end block unit 13 is fastened to the rear open end of the casing 10 by screws. The trigger 14 is pivoted to the end block unit 13. By means of operating the trigger 14, the mechanism of the end block unit 13 which is comprised of spring holder means, bolt means, socket means, push rod means, etc., is driven to close/open the air passage, and therefore the piston rod 110 is moved with the piston 111 to reciprocate the saw blade 12. This structure of the handy pneumatic power saw is not durable in use because the moving parts wear quickly with use. When the moving parts of the handy pneumatic power saw begins to wear, an air leakage may occur, thereby causing the saw blade 12 unable to be smoothly reciprocated. Because the piston rod 110 and the piston 111 are reciprocated to compress and release air pressure, the reciprocating movement of the saw blade 12 becomes unstable when an air leakage occurs. When the actuating unit 11 is installed in the actuating chamber 101, the air cylinder 112 is forced by the valve block 115 against the front side wall of the actuating chamber 101. However, because the air cylinder 112 and the valve block 115 both are made from metal, they are not compressible. When the piston 111 is reciprocated, the front rubber cushion 113 is intermittently forced to strike against the front side wall of the actuating chamber 101, causing a backward force to be produced and transmitted to the end block unit 13. Frequently giving a backward force to the end block unit 13 causes the mounting screws of the end block unit 13 to be loosened and a gap to be produced between the end block unit 13 and the casing 10. When a gap occurs between the end block unit 13 and the casing 10, a leakage of air becomes inevitable.

SUMMARY OF THE INVENTION

The present invention has been accomplished to provide an air-tight sealing arrangement for a handy pneumatic power saw which eliminates the aforesaid problem. According to the present invention, the air-tight sealing arrangement comprises a flexible gasket retained between the rear end of the casing of the handy pneumatic power saw and the end block unit thereof, an annular metal member mounted around the piston rod of the actuating unit of the handy pneumatic power saw and retained between the air cylinder of the actuating unit and the front side wall of the actuating chamber of the casing of the handy pneumatic power saw, and a flexible sealing gasket mounted around the piston rod of the actuating unit and retained between the annular metal member and the front side wall of the actuating chamber. The flexible gasket and the flexible sealing gasket are compressible, therefore, they are capable of compensating the dimensional manufacturing tolerance of the parts of the handy pneumatic power saw.

DETAILED DESCRIPTION OF THE PREFERRED EMBODIMENT

Figure 1:
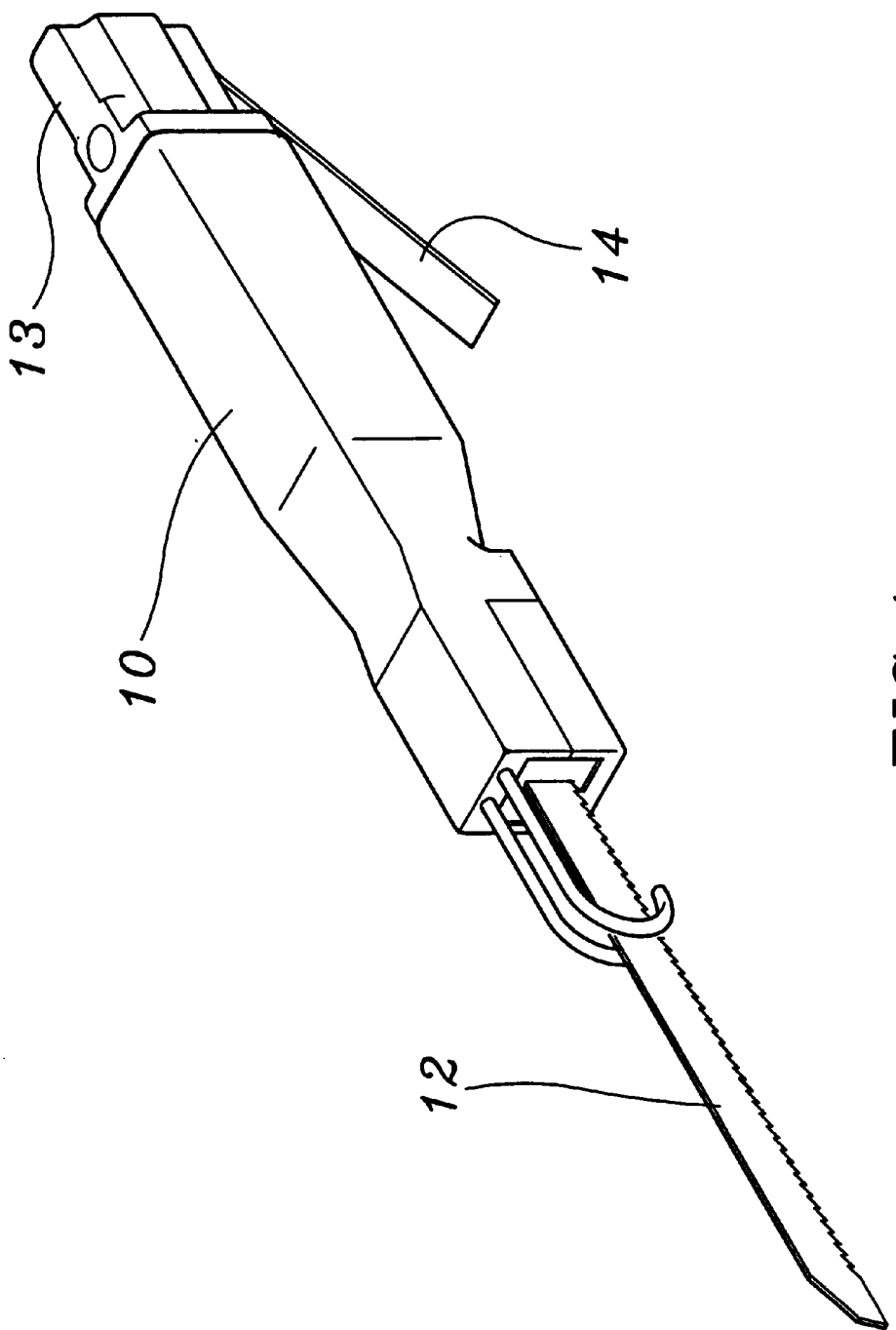
FIG. 1 is perspective view of a handy pneumatic power saw according to the prior art.
Figure 2:
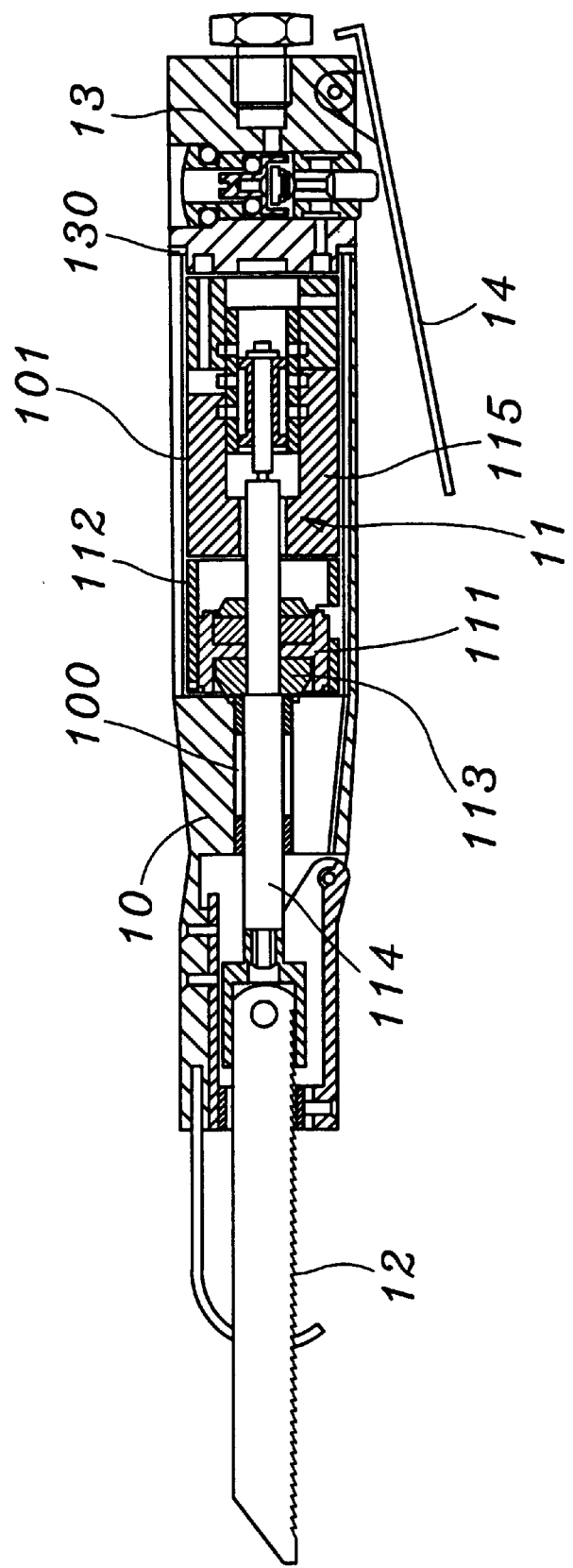
FIG. 2 is a longitudinal view in section of the handy pneumatic power saw shown in FIG. 1.
Figure 3:
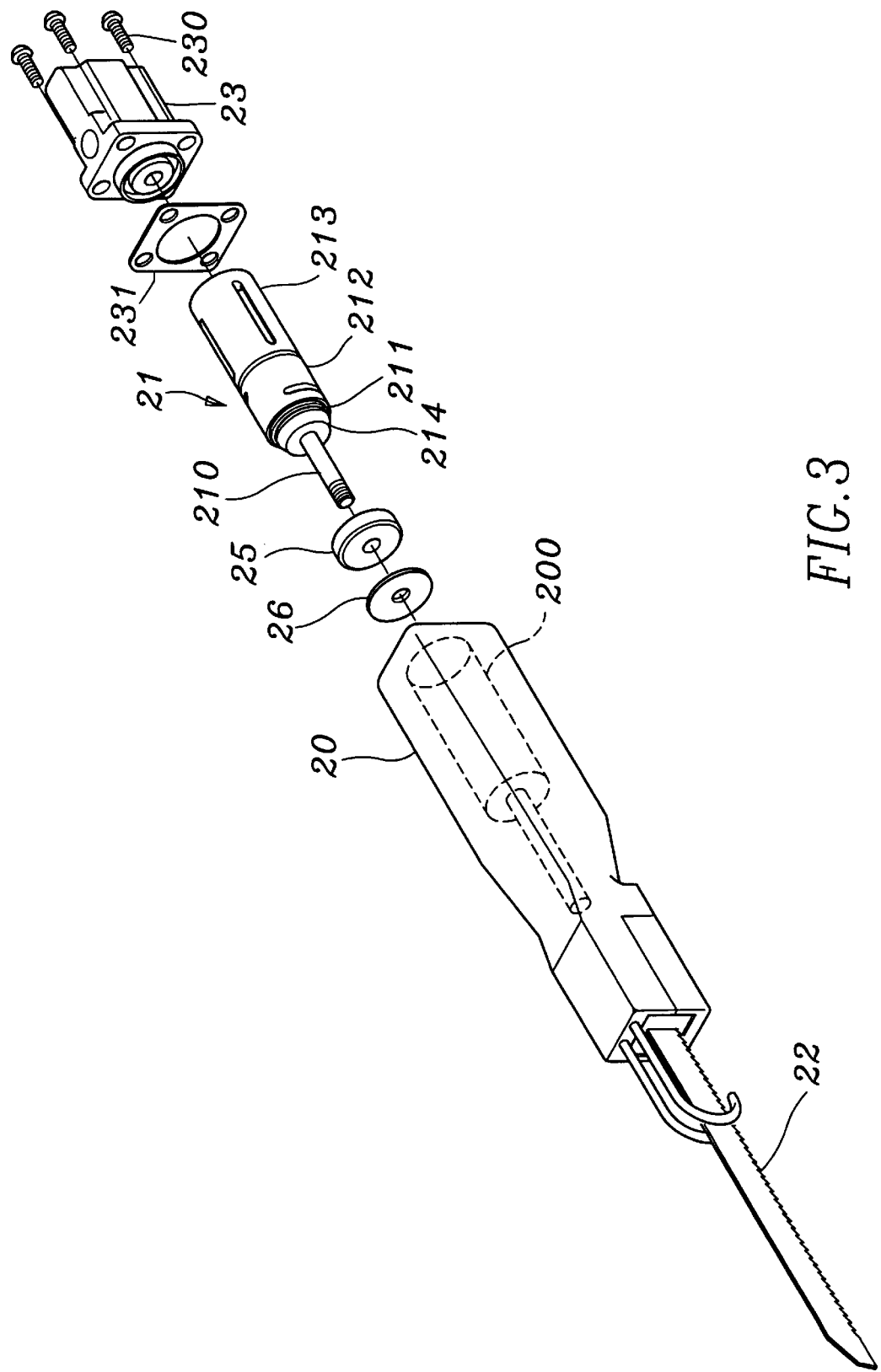
FIG. 3 is an exploded view of a handy pneumatic power saw according to the present invention.
Figure 4:
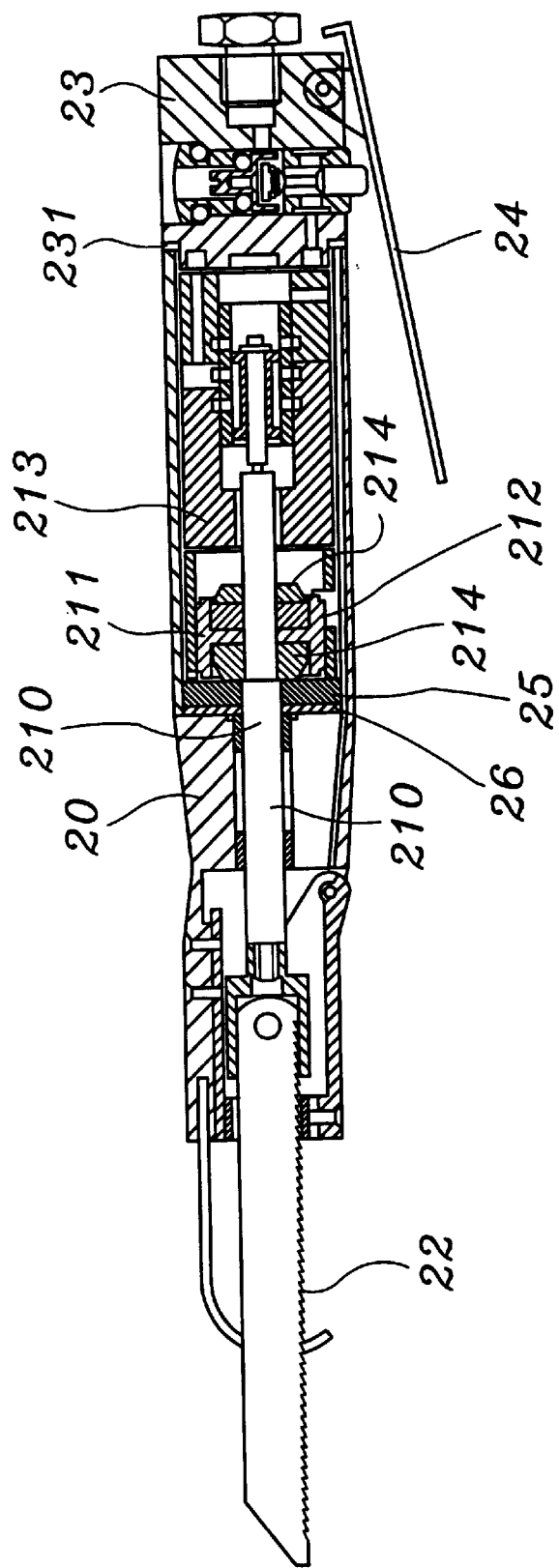
FIG. 4 is a longitudinal view in section of the handy pneumatic power saw shown in FIG. 3.

Referring to FIGS. 3 and 4, a handy pneumatic power saw is shown comprised of a casing 20, an actuating unit 21, a saw blade 22, and end block unit 23, and a trigger 24. The actuating unit 21 is comprised of a piston rod 210, a piston 211, an air cylinder 212, and a valve block 213. The casing 20 comprises an actuating chamber 200, which receives the actuating unit 21. The piston rod 210 has a front end connected to the saw blade 22, and a rear end connected to the piston 211. Two rubber cushions 214 are fastened to front and rear sides of the piston 211. The end block unit 23 is fastened to the rear end of the casing 20 by screws 230.

The air-tight sealing arrangement of the invention comprises a flexible gasket 231 retained between the rear end of the casing 20 and the end block unit 23 to seal the gap between the valve block 213 and the end block unit 23, an annular metal member 25 mounted around the piston rod 210 and retained between the air cylinder 212 of the actuating unit 21 and the front side wall of the actuating chamber 200, and a flexible sealing gasket 26 mounted around the piston rod 210 and retained between the annular metal member 25 and the front side wall of the actuating chamber 200.

When the gaskets 231;26 are installed, the gap between the casing 20 and the end block unit 23 and the gap between the actuating unit 21 and the casing 20 are sealed air-tightly. Because the gaskets 231;26 are made flexible material, they are compressible, and can compensate any dimensional manufacturing tolerance of the parts of the handy pneumatic power saw. Furthermore, because the annular metal member 25 is retained between the air cylinder 212 and the flexible sealing gasket 26, the flexible sealing gasket 26 is well protected. When the rubber cushions 214 are moved with the piston 211 and the piston rod 210 to strike against the annular metal member 25, shocks are absorbed by the flexible sealing gasket 26, therefore little backward force is produced and transmitted to the end block unit 23.

As indicated above, the air-tight sealing arrangement of the invention effectively seals the actuating chamber 200 in an air tight condition, and eliminates the occurrence of a backward force upon a forward stroke of the piston 211.

While only one embodiment of the present invention has been shown and described, it will be understood that various modifications and changes could be made thereunto without departing from the spirit and scope of the invention disclosed.

What the invention claimed is:

1. An air-tight sealing arrangement in combination with a pneumatic power saw, said power saw comprising:

a casing having an actuating chamber formed therein;

an actuating unit mounted in said actuating chamber and having a reciprocatingly driven piston within an air cylinder, said piston having a piston rod extending therefrom;

an end block unit fastened to a rear end of said casing and coupled to said actuating unit;

a saw blade connected to said piston rod;

an annular metal member mounted around said piston rod and retained between said air cylinder and a front wall of said actuating chamber; and, a flexible sealing gasket mounted around said piston rod and retained between said annular metal member and said front wall of said actuating chamber.

* * * * *